United States Patent
Lee

(10) Patent No.: US 11,916,371 B2
(45) Date of Patent: Feb. 27, 2024

(54) ANTI-PINCH CONTROL SYSTEM

(71) Applicant: HYUNDAI TRANSYS INC., Chungcheongnam-do (KR)

(72) Inventor: Ho Cheoul Lee, Gyeonggi-do (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 369 days.

(21) Appl. No.: 17/403,291

(22) Filed: Aug. 16, 2021

(65) Prior Publication Data

US 2022/0123546 A1     Apr. 21, 2022

(30) Foreign Application Priority Data

Oct. 21, 2020 (KR) .................. 10-2020-0136689

(51) Int. Cl.
*G01D 5/00* (2006.01)
*H02H 7/085* (2006.01)
*B60N 2/02* (2006.01)
*G01D 5/14* (2006.01)

(52) U.S. Cl.
CPC .......... *H02H 7/0851* (2013.01); *B60N 2/0244* (2013.01); *B60N 2/02246* (2023.08); *G01D 5/145* (2013.01); *B60N 2/0272* (2023.08)

(58) Field of Classification Search
CPC .... H02H 7/0851; H02H 3/006; H02H 7/0858; B60N 2/02246; B60N 2/0244; B60N 2/0272; B60N 2/0256; B60N 2/0268; G01D 5/145
See application file for complete search history.

(56) References Cited

U.S. PATENT DOCUMENTS

| | | | |
|---|---|---|---|
| 2005/0127776 A1* | 6/2005 | Greene | H02K 23/66 310/239 |
| 2007/0164619 A1* | 7/2007 | Greene | H02K 23/66 310/68 B |
| 2009/0138161 A1 | 5/2009 | Wagner | |

FOREIGN PATENT DOCUMENTS

| | | |
|---|---|---|
| CN | 207565386 U | 7/2018 |
| CN | 109532577 A | 3/2019 |
| CN | 111361468 A | 7/2020 |

OTHER PUBLICATIONS

The First Chinese Office Action dated May 27, 2023; Appln. No. 202110935722.6.

* cited by examiner

*Primary Examiner* — Ian Jen

(57) ABSTRACT

Disclosed is an anti-pinch control system. The anti-pinch control system includes a motor configured to generate driving force for moving a seat of a vehicle, a current measurement sensor configured to measure a current value generated in the motor, a hall sensor configured to measure a revolution per minute (RPM) of the motor, and a controller configured to derive an average of current values measured by the current measurement sensor during an edge generating time during which a specific number of edges are generated by the hall sensor, and to set, to an anti-pinch value, a value obtained by adding a rising value, corresponding to current that increases when a pinch occurs in the seat, to the average, wherein the controller derives the average for each specific RPM and updates the anti-pinch value.

11 Claims, 4 Drawing Sheets

ANTI-PINCH CONTROL SYSTEM

CROSS-REFERENCE TO RELATED APPLICATION

This application claims under 35 U.S.C. § 119(a) the benefit of priority to Korean Patent Application No. 10-2020-0136689 filed on Oct. 21, 2020, the entire contents of which are incorporated herein by reference.

BACKGROUND

(a) Technical Field

The present disclosure relates to an anti-pinch control system for continuously updating an anti-pinch value for braking control of a motor of a seat.

(b) Background Art

As an electronic apparatus for driving a seat for improving the convenience for a driver has been popularized, accidents have frequently occurred for reasons including carelessness of a user and malfunction of a device. To overcome the problem, various safety regulations have been established and applied with respect to an anti-pinch system for preventing an obstacle from being pinched. The anti-pinch system is a safety system that is applied to components of a vehicle that are driven in an electronic manner, such as a power window, a sunroof, or a seat, and that prevents a part of a human body or an obstruction from being pinched by an automatically driven component.

However, in the condition in which the load applied to a motor for driving a seat changes continuously, because an anti-pinch value is fixedly set, there is a problem in that driving of a seat is not stopped even if a person is pinched by the seat.

The load applied to the motor may change depending on the current position of the seat. Because an anti-pinch value is fixedly set in a general anti-pinch control system, there is a problem in that a change in the position of a seat is not appropriately applied.

SUMMARY OF THE DISCLOSURE

In one aspect, the present disclosure provides an anti-pinch control system for continuously updating an anti-pinch value for braking control of a motor of a seat.

In another aspect, the present disclosure provides an anti-pinch control system for improving the reliability of a procedure of deriving an anti-pinch value and deriving the anti-pinch value to which the characteristics of the load applied to the motor are applied.

An embodiment of the present disclosure provides an anti-pinch control system. The anti-pinch control system includes a motor configured to generate driving force for moving a seat of a vehicle, a current measurement sensor configured to measure a current value generated in the motor, a hall sensor configured to measure a revolution per minute (RPM) of the motor, and a controller configured to derive an average of current values measured by the current measurement sensor during an edge generating time during which a specific number of edges are generated by the hall sensor, and to set, to an anti-pinch value, a value obtained by adding a rising value, corresponding to current that increases when a pinch occurs in the seat, to the average, wherein the controller derives the average for each specific RPM and updates the anti-pinch value.

For example, when a current value, which is measured by the current measurement sensor during a first time interval just after the motor is driven, is outside a preset range, the controller may determine the current value measured during the first time interval as noise.

For example, the controller may set a value obtained by adding the rising value to an average of current values measured during a second time interval after the first time interval, to an initial anti-pinch value.

For example, the controller may control the motor based on the initial anti-pinch value during the edge generating time after the first time interval.

For example, the controller may derive the anti-pinch value of a next period based on the average of the current values measured during the edge generating time after the first time interval.

For example, the controller may preset a maximum pinch current value, and the controller may determine that a pinch occurs in the seat when a current value equal to or greater than the maximum pinch current value is measured by the current measurement sensor.

For example, the anti-pinch value may not be greater than the maximum pinch current value.

For example, the controller may control the motor in an opposite direction to a current driving direction when a current value measured in real time by the current measurement sensor is equal to or greater than the anti-pinch value.

For example, after the motor is controlled in the opposite direction to the current driving direction, the controller may disregard a current value measured by the current measurement sensor during a first time interval, and may newly set an anti-pinch value based on an average of current measured by the current measurement sensor during a second time interval after the first time interval.

For example, the current measurement sensor may measure current whenever an edge is generated by the hall sensor, and the controller may record a current value measured by the current measurement sensor.

For example, the edge generating time may indicate a time during which the hall sensor generates a specific number of edges, and may be a time that is changed depending on a voltage applied to the motor or a load applied to the seat.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
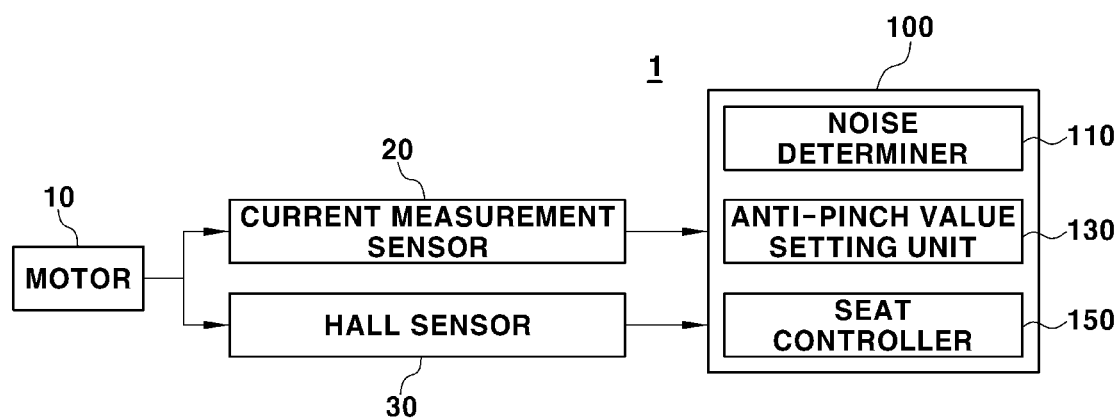
FIG. 1 is a block diagram showing an anti-pinch control system according to an embodiment of the present disclosure.

The attached drawings for illustrating exemplary embodiments of the present disclosure are to be referred to in order to gain a sufficient understanding of the present disclosure, the merits thereof, and the objectives accomplished by the implementation of the present disclosure. The present disclosure may, however, be embodied in many different forms, and should not be construed as being limited to the embodiments set forth herein; rather, these embodiments are provided so that this disclosure will be thorough and complete, and will fully convey the concept of the present disclosure to one of ordinary skill in the art. Meanwhile, the terminology used herein is for the purpose of describing particular embodiments and is not intended to limit the present disclosure. Like reference numerals in the drawings denote like elements.

Terms such as 'unit' or 'module', etc., should be understood to indicate units that process at least one function or operation and that may be embodied in a hardware manner, a software manner, or a combination of a hardware manner and a software manner.

Terms, such as "first", "second", and the like used in the specification may be used to distinguish the relevant elements using the reference relationship, and are not limited by the order.

The detailed description is used to exemplify the present disclosure. The description herein is given to show exemplary embodiments of the present disclosure, and the present disclosure may be used in various other combinations, changes, and environments. That is, the present disclosure may be changed or modified within the scope of the concept of the present disclosure disclosed in the specification, the equivalent scope of the given disclosure, and/or the scope of the technology or knowledge in the art. The described embodiment is the ideal embodiment for implementing the technological spirit of the present disclosure, but may be changed in various forms required in detailed applications and use of the present disclosure. Thus, the detailed description of the present disclosure herein is merely exemplary, and is not intended to limit the present disclosure. The following claims are to be interpreted as including other embodiments.

FIG. 1 is a block diagram showing an anti-pinch control system according to an embodiment of the present disclosure.

Referring to FIG. 1, an anti-pinch control system 1 may include a motor 10, a current measurement sensor 20, a hall sensor 30, and a controller 100. The anti-pinch control system 1 may change an anti-pinch value of a seat in consideration of a required current value of the motor 10, which is changed depending on the load applied to the seat in real time. The anti-pinch value may be a limiting value of the amount of current required by the motor 10 depending on the load applied to the motor 10.

The motor 10 may generate driving force for moving the seat of a vehicle. In detail, the motor 10 may perform folding and unfolding of the seat. A current value required when the motor 10 performs folding and unfolding of the seat may be measured by the current measurement sensor 20. In this case, when a load is high, this means that an object or a person is pinched by the seat. The current measurement sensor 20 may measure current consumed by the motor 10 in real time.

The hall sensor 30 may be a magnetic to electrical converter using a hall sensor and may be used as a speed sensor of the motor 10. The hall sensor 30 may output a pulse in order to recognize the position of the seat when the motor 10 is driven. In other words, the hall sensor 30 may measure a revolution per minute (RPM) of the motor 10. According to an embodiment of the present disclosure, the current measurement sensor 20 may measure current whenever an edge is generated by the hall sensor 30. A current value measured by the current measurement sensor 20 may be recorded in the controller 100.

The controller 100 may derive an anti-pinch value for determining whether a pinch occurs in the seat and may control the motor 10 based on the anti-pinch value. The controller 100 may include a noise determiner 110, an anti-pinch value setting unit 130, and a seat controller 150.

The noise determiner 110 may determine the current value as noise when the current value, which is measured by the current measurement sensor 20 during a first time interval just after the motor 10 is driven, is outside a preset range. For example, the first time interval may be 300 ms. The current value generated in the motor 10 may become unstable just after the motor 10 is driven. When the anti-pinch value is set based on the current value measured during the first time interval, the reliability of the anti-pinch value may be degraded. Thus, when the current value, which is measured by the current measurement sensor 20 during the first time interval, is outside a preset range, the noise determiner 110 may disregard the current value measured during the first time interval.

The anti-pinch value setting unit 130 may derive an average of current values measured by the current measurement sensor 20 during an edge generating time at which the hall sensor 30 generates a specific number of edges, and may set, to an anti-pinch value, a value obtained by adding a rising value, which corresponds to current that increases when a pinch occurs in the seat, to the average. The edge generating time may refer to the time during which the hall sensor 30 generates a specific number of edges and may not refer to a specific time. For example, the edge generating time may be the time at which the hall sensor 30 generates 500 edges and may be the time that is changed depending on a voltage applied to the motor 10 or the load applied to the seat. However, the specific number of edges may not be particularly limited and may be changed depending on a designer. The rising value may be a value that is input to the anti-pinch value setting unit 130 in advance. For example, the rising value may be 3 A but may be changed by a designer. A current value of 3 A may correspond to 5 kgfm to 8 kgfm which is a torque value that is generated when a pinch occurs in the seat. For example, the time during which the motor 10 rotates by a specific RPM may refer to the time during which the hall sensor 30 generates 500 edges in a derived waveform. The anti-pinch value setting unit 130 may derive the average of the current values measured while the seat is rotated at a predetermined angle rather than deriving an average of current values measured at a predetermined time interval. That is, the anti-pinch value setting unit 130 may derive the average of the current values at a specific RPM of the motor 10 as a measurement period. The anti-pinch value setting unit 130 may set a value obtained by adding the rising value to the average of the current values, to an anti-pinch value, and may derive an average for each specific RPM and may continuously update the anti-pinch value.

The anti-pinch value setting unit 130 may set a maximum pinch current value in order to detect the current value that continuously increases. For example, the anti-pinch value cannot be larger than the maximum pinch current value. When current continuously increases and the anti-pinch value also continuously increases, the anti-pinch value may be larger than the maximum pinch current value. Accordingly, according to the present disclosure, the maximum pinch current value may be set in advance and the anti-pinch value may be limited not to be larger than the maximum pinch current value. When current continuously increases and the anti-pinch value also continuously increases, if a current value equal to or greater than the maximum pinch current value is measured by the current measurement sensor 20, the anti-pinch value setting unit 130 may determine that a pinch occurs in the seat.

The seat controller 150 may control driving of the motor 10 based on the set anti-pinch value. For example, when the current value measured by the current measurement sensor 20 is equal to or greater than the anti-pinch value, the seat controller 150 may stop driving of the motor 10. In another example, when the current value measured by the current measurement sensor 20 is equal to or greater than the anti-pinch value, the seat controller 150 may rotate the motor 10 at a predetermined angle in an opposite direction. For example, the predetermined angel may be about 5 degrees, and the opposite direction may be defined based on a direction in which the motor 10 is operated. Thereby, a problem in that a person or an object is pinched by the seat to injure the person or to damage the object may be overcome.

According to an embodiment of the present disclosure, the controller 100 may continuously update the anti-pinch value based on the current value measured during a predetermined period. The current value required by the motor 10 may be changed depending on the load that is changed in real time, and the controller 100 may measure the current value in real time to vary the anti-pinch value. The anti-pinch value may be changed depending on the load that is changed in real time, and in this case, a phenomenon in which the anti-pinch value is changed too sensitively may also be prevented by updating the anti-pinch value based on a rotation angle of the motor 10 rather than updating the anti-pinch value every predetermined time. Thus, the anti-pinch control system 1 may reset the anti-pinch value and may improve the stability of the anti-pinch value based on a current value having a value corresponding to the current value required by the motor 10 by applying the current state of the motor 10 in real time.

When the anti-pinch value is set by acquiring an average of current values every predetermined time rather than setting the anti-pinch value at every angle, if a voltage applied to the motor 10 is high or the load is small, there is a problem in that the characteristics of the load that is currently applied to the seat are not capable of being rapidly applied because current is measured for an excessively long period. In contrast, when a voltage applied to the motor 10 is low or the load applied to the seat is high, the anti-pinch value may be frequently updated for a short period, and accordingly there is a problem in that anti-pinch standards are too sensitive. In other words, when the voltage applied to the motor 10 is low or the load applied to the seat is high, if an average of current values is acquired every predetermined time, there may be a problem in that an anti-pinch standard value is set based on an average of current value measured before the motor 10 is rotated once (i.e., based on only a portion of rotation of the motor). Accordingly, according to an embodiment of the present disclosure, whenever the motor 10 is rotated at a predetermined angle, the anti-pinch control system 1 may reset the anti-pinch value and may apply the characteristics of the load that is currently applied to the seat.

Figure 2:
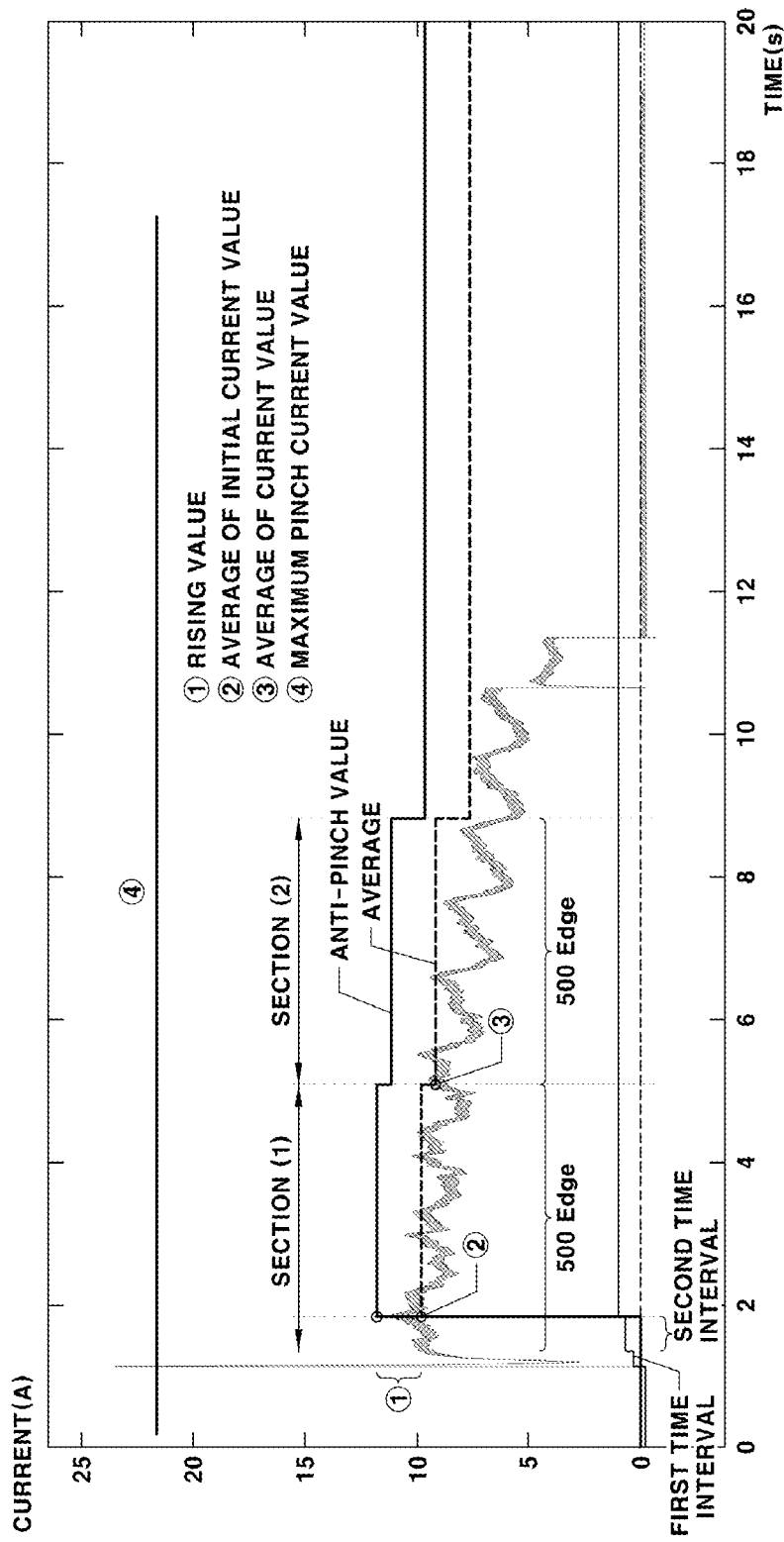
FIG. 2 is a graph for explaining the logic for updating an anti-pinch value according to an embodiment of the present disclosure.

FIG. 2 is a graph for explaining the logic for updating an anti-pinch value according to an embodiment of the present disclosure.

Referring to FIGS. 1 and 2, the current value measured during the first time interval just after the motor 10 is driven may be disregarded by the noise determiner 110. For example, the first time interval may be 300 ms. That is, the current value measured during the first time interval just after the motor 10 is driven may not be used to derive the anti-pinch value. A maximum pinch current value ④ may be preset in the controller 100.

In a section (1), the anti-pinch value setting unit 130 may derive an average of current values measured during a second time interval after the first time interval. The second time interval may be greater than the first time interval. For example, the second time interval may be 500 ms. The section (1) may refer to the time during which 500 edges are generated by the hall sensor 30 and may be a section that begins after the first time interval. The average of the current values measured during the second time interval may be defined as an average ② of initial current values. The anti-pinch value setting unit 130 may derive a value obtained by adding a preset rising value ① to the average ② of the initial current values, as an initial anti-pinch value.

In a section (2), the anti-pinch value setting unit 130 may derive a new anti-pinch value based on an average ③ of new current values measured in the section (1). That is, the anti-pinch value setting unit 130 may derive a new anti-pinch value of a next section based on the average ③ of the current values measured in a previous section. The section (2) may refer to the time during which 500 edges are generated by the hall sensor 30. Accordingly, the section (2) and the section (1) may have temporally different time intervals. This is because the time during which 500 edges are generated by the hall sensor 30 is changed depending on the voltage and load applied to the motor 10. The average of current values measured in the section (2) may be used to derive a new anti-pinch value in a next section.

The initial anti-pinch value may be derived based on the average of the current values measured during the second time interval. In this case, there is a problem in that a temporal gap in which whether a pinch occurs in the seat is not capable of being determined is increased when an anti-pinch value after 500 edges are generated by the hall sensor 30 even just after the motor 10 is driven. Accordingly, the initial anti-pinch value of the controller 100 may be derived based on the average of the current values measured during the second time interval that is a considerably short time.

After the initial anti-pinch value is derived, the anti-pinch value may be derived based on the average of the current values measured while 500 edges are generated by the hall sensor 30 in a previous section. While the motor 10 is driven, the controller 100 may continuously update the anti-pinch value using the aforementioned method.

Figure 3:
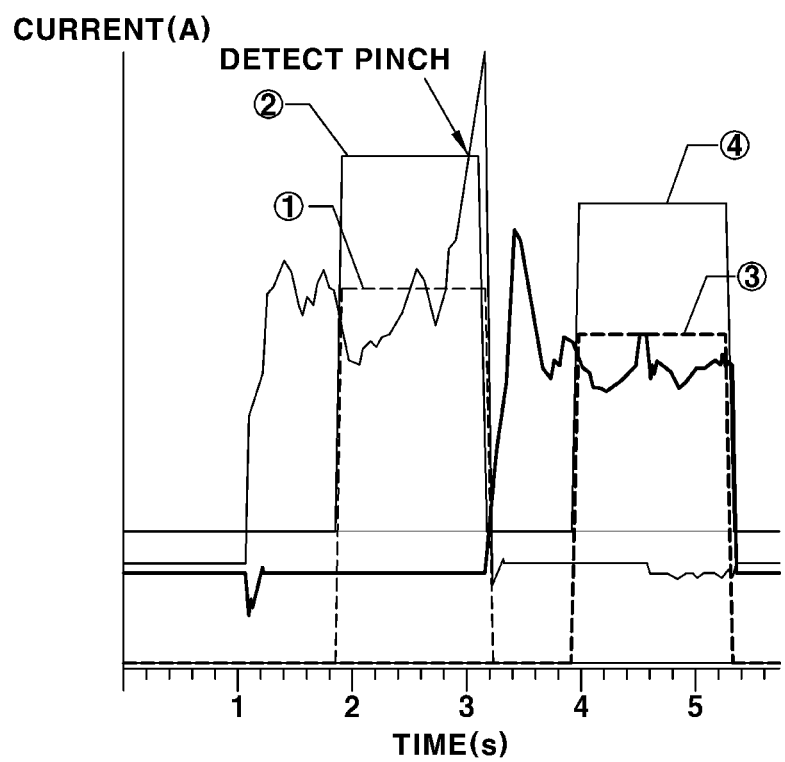
FIG. 3 is a graph for explaining a change in a current value and a change in an anti-pinch value when a pinch occurs in a seat according to an embodiment of the present disclosure.

FIG. 3 is a graph for explaining a change in a current value and a change in an anti-pinch value when a pinch occurs in a seat according to an embodiment of the present disclosure. For brevity of description, a repeated description will be omitted.

Referring to FIGS. 1 to 3, an initial anti-pinch value ② may be derived based on an average ① of current values. When the current value measured by the current measurement sensor 20 is equal to or greater than the anti-pinch value(②) (a pinch due to driving of a seat is detected), the controller 100 may control driving of the motor 10 in an opposite direction to an existing driving direction. Then, the controller 100 may disregard the current value measured during the first time interval and may derive a new average ③ based on the average of current values measured during the second time interval after the first time interval. The controller 100 may derive a new anti-pinch value ④ based on the new average ③. That is, the controller 100 may newly reset an anti-pinch value after the pinch of the seat is detected.

Figure 4:
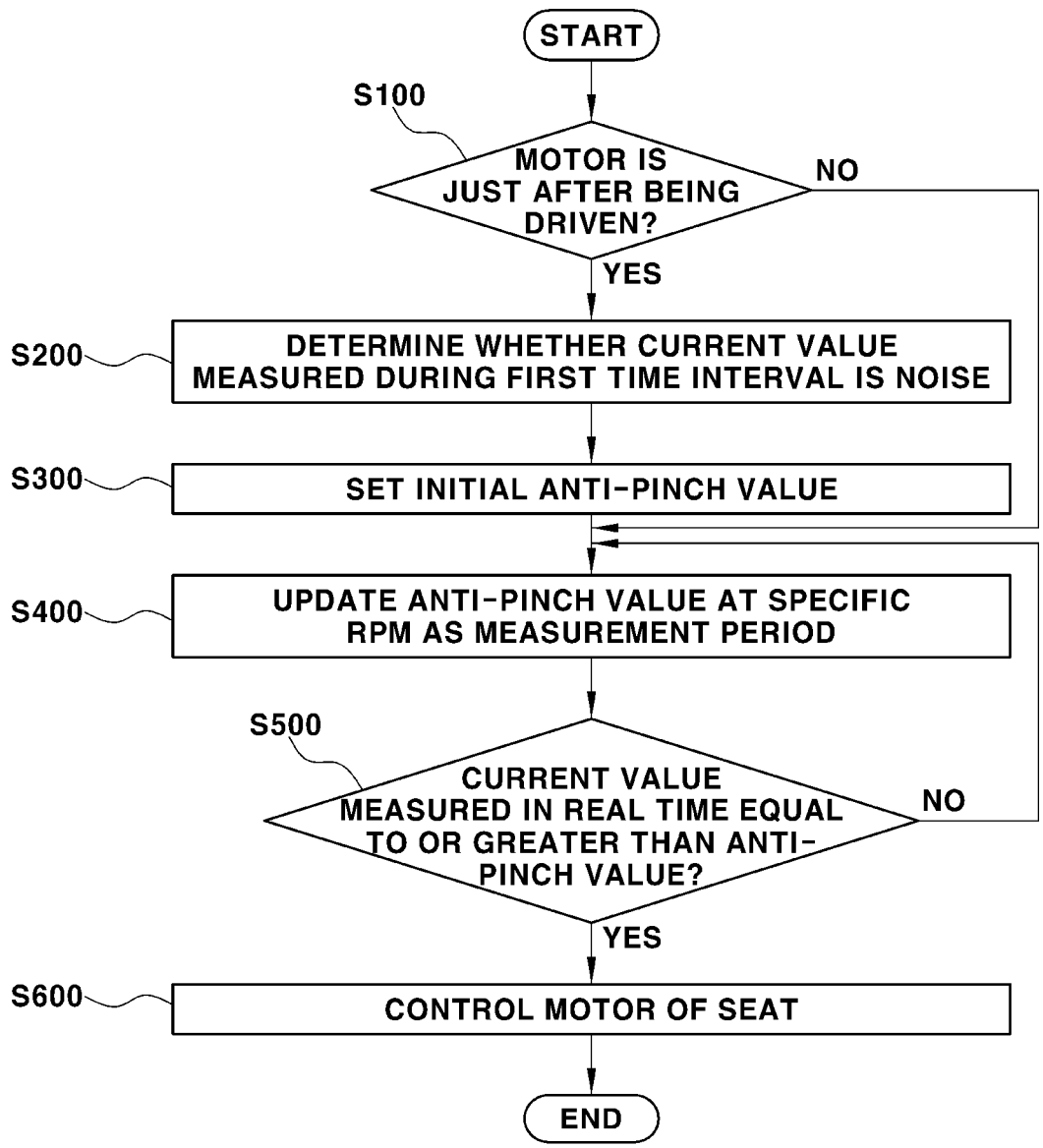
FIG. 4 is a flowchart for explaining an anti-pinch control method according to an embodiment of the present disclosure.

FIG. 4 is a flowchart for explaining an anti-pinch control method according to an embodiment of the present disclosure.

Referring to FIG. 4, a controller may determine a method of deriving an anti-pinch value based on whether a motor is just after being driven (S100).

Just after the motor is driven, a controller may determine whether the current value measured during the first time interval just after the motor is driven is noise. The controller may disregard the current value measured during the first time interval and may derive the anti-pinch value based on the current value measured thereafter (S200).

The controller may derive a value obtained by adding a rising value to the average of the current value measured during the second time interval after the first time interval, as an initial anti-pinch value (S300).

An existing anti-pinch value may be set because the motor is not just after being driven, or the controller may continuously update the anti-pinch value after the initial anti-pinch value is set. In detail, the controller may update the anti-pinch value at a specific RPM (which is the time during which 500 edges are generated by the hall sensor 30) as a measurement period. The controller may derive the anti-pinch value at a specific RPM instead of a specific time and thus may be capable of rapidly applying the characteristics of the voltage or load applied to the motor to the anti-pinch value (S400).

The current measurement sensor may measure the current value required by the motor in real time, and the controller may monitor whether the current value is equal to or greater than the anti-pinch value (S500).

When the current value measured in real time is equal to or greater than the anti-pinch value, the controller may perform motor braking control on the seat. That is, when the current value measured in real time is equal to or greater than the anti-pinch value, the controller may determine that a pinch occurs in the seat and may prevent a person from being injured or an object from being damaged due to a pinch of the seat by stopping driving of the motor. When the current value measured in real time is less than the anti-pinch value, the controller may not perform braking control of the motor (S600).

According to an embodiment of the present disclosure, whenever the motor is rotated at a predetermined angle, the anti-pinch control system may reset the anti-pinch value and may apply the characteristics of the load that is currently applied to the seat.

According to an embodiment of the present disclosure, the anti-pinch control system may process the current value measured for a predetermined time just after the motor is driven, as noise, and may derive the anti-pinch value based on the current value measured thereafter, thereby improving the reliability of the logic for deriving the anti-pinch value.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. An anti-pinch control system comprising:
   a motor configured to generate driving force for moving a seat of a vehicle;
   a current measurement sensor configured to measure a current value generated in the motor;
   a hall sensor configured to measure a revolution per minute (RPM) of the motor; and
   a controller configured to derive an average of current values measured by the current measurement sensor during an edge generating time during which a specific number of edges are generated by the hall sensor, and to set, to an anti-pinch value, a value obtained by adding a rising value, corresponding to current that increases when a pinch occurs in the seat, to the average,
   wherein the controller derives the average for each specific RPM and updates the anti-pinch value.

2. The anti-pinch control system of claim 1, wherein, when a current value, which is measured by the current measurement sensor during a first time interval just after the motor is driven, is outside a preset range, the controller determines the current value measured during the first time interval as noise.

3. The anti-pinch control system of claim 2, wherein the controller sets a value obtained by adding the rising value to an average of current values measured during a second time interval after the first time interval, to an initial anti-pinch value.

4. The anti-pinch control system of claim 3, wherein the controller controls the motor based on the initial anti-pinch value during the edge generating time after the first time interval.

5. The anti-pinch control system of claim 2, wherein the controller derives the anti-pinch value of a next period based on the average of the current values measured during the edge generating time after the first time interval.

6. The anti-pinch control system of claim 1, wherein:
   the controller presets a maximum pinch current value; and
   the controller determines that a pinch occurs in the seat when a current value equal to or greater than the maximum pinch current value is measured by the current measurement sensor.

7. The anti-pinch control system of claim 6, wherein the anti-pinch value is not greater than the maximum pinch current value.

8. The anti-pinch control system of claim 1, wherein the controller controls the motor in an opposite direction to a current driving direction when a current value measured in real time by the current measurement sensor is equal to or greater than the anti-pinch value.

9. The anti-pinch control system of claim 8, wherein, after the motor is controlled in the opposite direction to the current driving direction, the controller disregards a current value measured by the current measurement sensor during a first time interval, and newly sets an anti-pinch value based on an average of current measured by the current measurement sensor during a second time interval after the first time interval.

10. The anti-pinch control system of claim 1, wherein:
the current measurement sensor measures current whenever an edge is generated by the hall sensor; and
the controller records a current value measured by the current measurement sensor.

11. The anti-pinch control system of claim 1, wherein the edge generating time indicates a time during which the hall sensor generates a specific number of edges, and is a time that is changed depending on a voltage applied to the motor or a load applied to the seat.

* * * * *